United States Patent [19]
Mason

[11] 3,746,432
[45] July 17, 1973

[54] OCULOMETER FOCUS MONITORING
[75] Inventor: Kenneth A. Mason, Boston, Mass.
[73] Assignee: Honeywell Inc., Minneapolis, Minn.
[22] Filed: July 6, 1971
[21] Appl. No.: 159,704

[52] U.S. Cl. .................................. 351/6, 250/201
[51] Int. Cl. .............................................. A61b 3/14
[58] Field of Search ............... 351/6, 7; 250/201, 250/229

[56] References Cited
UNITED STATES PATENTS
3,549,889  12/1970  Akiyama ........................... 250/201
3,536,383  10/1970  Cornsweet et al. ................. 351/6

OTHER PUBLICATIONS
Cooper, IBM Tech. Disclosure Bull., Vol. 5 No. 4, 9–1962.

Primary Examiner—Samuel Feinberg
Assistant Examiner—S. C. Buczinski
Attorney—Charles J. Ungemach, George W. Field et al.

[57] ABSTRACT

An improved oculometer including a vibrating aperture and associated apparatus for monitoring axial change in the position of the observer's eye with respect to the input lens.

3 Claims, 1 Drawing Figure

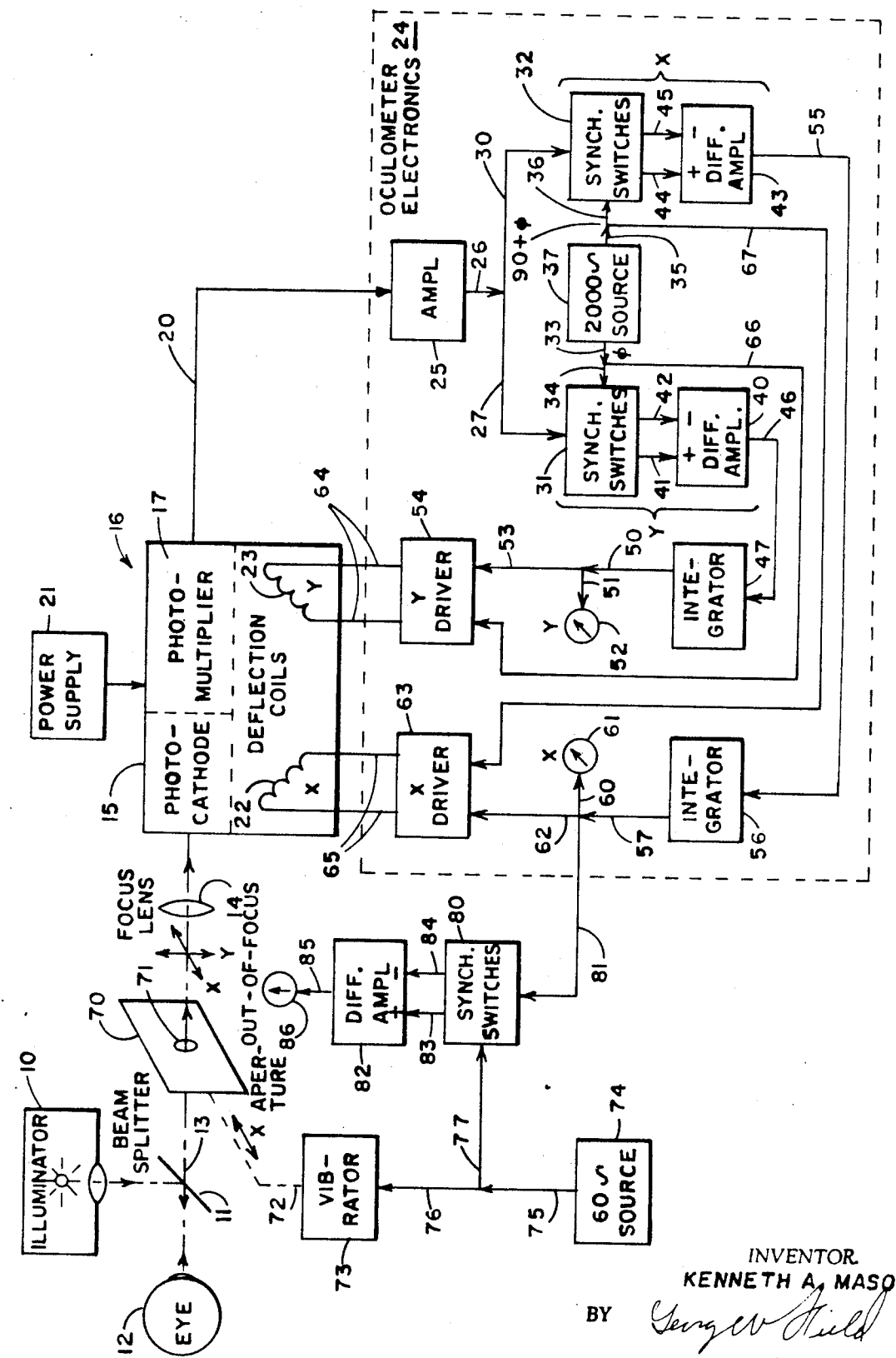

OCULOMETER FOCUS MONITORING

BACKGROUND OF THE INVENTION

This invention relates to the field of optical instruments and more particularly to an improved oculometer, or instrument for giving an output which varies with variations in the direction of the line of regard of a user of the instrument. In such instruments, of the laboratory type, constraints may be placed upon the movement of the user's head toward or away from the instrument, so that the accuracy of the instrument is not compromised thereby. However, when it is contemplated to use an oculometer in a practical environment, axial movements of the user's head cannot ordinarily be prevented, and such movements have been found to introduce inaccuracies into the output of the instrument. It is accordingly desirable to include in an oculometer some means for detecting axial eye movement of the user so that its effect may be allowed or compensated for.

DESCRIPTION OF THE PRIOR ART

One method of accomplishing this desired result is taught in the copending application of John Merchant, Ser. No. 105,525 filed Jan. 11, 1971, and assigned to the assignee of the present application. While that arrangement has no mechanically moving parts, it requires certain complexity in its electrical circuit, and from an overall standpoint the present, quite different invention is found to have practical superiority.

BRIEF SUMMARY OF THE INVENTION

It is accordingly the principal object of the invention to provide new and improved means for monitoring the axial displacement of the eye of an observer using an oculometer. A more specific object of the invention is to provide an oculometer in which simplicity of electrical circuitry is obtained by using a member having a simple, reliable mechanical movement.

The purposes of the invention are accomplished by an arrangement which measures the extent of departure, from a focused condition, of the optical system made up of the corneal reflection from the user's eye as a source, a focusing lens, and the light sensitive element of the oculometer detector as an image plane. To do this a transversely vibrating aperture is inserted in the axis of this optical system, preferably very close to the focusing lens. The diameter of the aperture is smaller than the diverging pencil of rays passing through the lens, and its amplitude of vibration is small enough so that it never moves entirely out of this pencil of rays. Then as long as the eye is at such a distance from the lens that the optical system is focused, vibration of the aperture produces no output signal from the oculometer. If the eye moves too close to or too far from the focusing lens, however, the oculometer output contains a component of the frequency of vibration of the aperture, which component is of one of two opposite phases depending on the sense of the defocusing which takes place. This signal may be extracted from the complex oculometer signal by suitable synchronous demodulation, and used for any desired purpose.

Various other objects, advantages, and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWINGS

The single FIGURE of the drawing is a schematic showing of an oculometer incorporating the invention.

DESCRIPTION OF THE PREFERRED EMBODIMENT

Referring now to the drawing, an illuminator 10 is shown supplying a beam of radiant energy which is reflected by a half silvered mirror 11 to the eye 12 of the observer. The eye acts essentially as a convex spherical mirror reflecting the energy back in its original direction as a diverging beam. This energy may conveniently be of a wavelength beyond the visible spectrum. The reflected energy passes through mirror 11 along an axis 13 to a lens 14, which focuses the light on the photocathode 15 of an image dissector tube 16 having a photomultiplier 17 which gives an output at 20 proportional to the instantaneous irradiation of photocathode 15. Image dissector 16 is suitably energized and focused from a power supply 21, and includes a pair of deflection coils 22 and 23 which may be supplied with centering voltages from power supply 21 in the usual fashion, not shown.

It will be understood that a complete oculometer has a further channel for tracking the center of the pupil in addition to the corneal reflection, as well as components for causing initial acquisition of the pupilary and corneal signals, and for preventing blinking of the observer's eye from unfavorably affecting the operation of the system, but these and other refinements are not pertinent to the present invention and will be given no further consideration here.

For convenience, the eye movements of the observer are defined by their components along the X- and Y- axes of a Cartesian system, horizontal components having X- coordinates and vertical components having Y- coordinates as suggested in the drawing.

Deflection coil 22 is physically arranged to act in alignment with the X- axis of the coordinate system mentioned above, and deflection coil 23 is arranged to act in a direction normal thereto and is therefore aligned with the Y- axis.

The output 20 of image dissector 16 is supplied to the oculometer electronics 24, which for illustrative purposes is shown to include an amplifier 25 which receives its input on conductor 20 and which supplies an output on conductors 26, 27, and 30 to pairs of out-of-phase synchronous switches 31 and 32. These switches are actuated, in 90 degree phase relationship, by voltages supplied on conductors 33 and 34 and conductors 35 and 36 respectively from an audio frequency alternating voltage source 37. Switches 31 energize a differential amplifier 40 through conductors 41 and 42 alternately and switches 32 energize a differential amplifier 43 through conductors 44 and 45 alternately. Differential amplifier 40 is connected through conductor 46, an integrator 47, and conductors 50 and 51 to an indicator 52, and further through conductors 50 and 53 to a deflection coil driver 54. Differential amplifier 43 is connected through conductor 55, an integrator 56, and conductors 57 and 60 to an indicator 61, and further through conductors 57 and 62 to a deflection coil driver 63. Driver 54 energizes deflection coil 23 through conductors 64, and driver 63 energizes deflection coil 22 through conductors 65. A circular scan is produced by coils 22 and 23 by reason of voltages supplied to the coils, through drivers 54 and 63, from source 37, through conductors 34 and 66 and conductors 35 and 67, respectively.

The apparatus thus far described is not new in the present application, and comprises a conventional oculometer. In order to determine when the eye of the operator moves axially from the position in which its reflected light is focused precisely on photocathode 15 by lens 14, there is interposed in the path of light between the eye and the photocathode a member 70 having an aperture 71. Member 70 is preferably located very close to lens 14, and in the drawing is shown to be located between the lens and mirror 11, although it may be located between lens 14 and photocathode 15. The diameter of aperture 71 is smaller than the diameter of the pencil of rays at its axial location and hence is of smaller effective diameter than the lens: only a portion of the light traverses the aperture to fall on the photocathode.

Member 70 is maintained in substantially rectilinear oscillation, alinged with the X- axis of the coordinate system, by being made unitary with or connected as at 72 to a vibrator 73 which may comprise a tuning fork energized from a low frequency alternating voltage source 74 through conductors 75 and 76. Also energized from source 74, through conductors 75 and 77, is a pair of synchronous switches 80. The output of integrator 56 is supplied to switches 80 through conductors 57 and 81, and the switches energize a differential amplifier 82 through conductors 83 and 84 alternately. Amplifier 82 is connected through a conductor 85 to an indicator 86.

According to well-known optical principals, as long as the optical system 12–14–15 is in focus movement of aperture 71 close to lens 14 produces no change in the energization of the photocathode. If the optical system is defocused, by reason of axial movement of element 12, vibration of aperture 71 produces a change in the position of the radiometric centroid of the image of cathode 15, and this results in addition to the photomultiplier output of a component of the frequency of source 74. This component varies in magnitude with the extent of defocusing of the optical system, and is determined in phase, relative to that of source 74, by the sense of the defocusing. It is not destroyed or lost by elements 25, 32, 43, and 56, and is extracted by switches 80 and converted by amplifier 82 to a signal at 85 actuating indicator 86 in a direction and to an extent representative of the out-of-focus movement of the eye.

The out-of-focus signal at 85 is related to the linear displacement of the eye by a simple geometric formula. If desired, the signal may be used to drive a servomotor which adjusts lens 14 axially until the focus condition is restored, when the signal becomes zero. The amount of lens adjustment is then a direct measure of the linear displacement of the eye, and moreover removes from the system any inaccuracies arising from the eye movement, but this feature per se is taught in the earlier Merchant application previously referred to.

In one successful embodiment of the invention aperture 71 was one-eighth inch in diameter and was mounted, adjacent a lens 14 having an effective diameter of one-quarter inch, on a 30 cycle tuning fork having a maximum excursion of one-eighth inch transverse to the optical axis of the lens. In this embodiment of the invention source 37 had a frequency of 2,000 Hertz, and the period of the circular sweep was 0.5 milliseconds.

Numerous objects and advantages of my invention have been set forth in the foregoing description, together with details of the structure and function of the invention, and the novel features thereof are pointed out in the appended claims. The disclosure, however, is illustrative only, and changes may be made in detail especially in matters of shape, size, and arrangement of parts, within the principle of the invention, to the full extent indicated by the broad general meaning of the terms in which the appended claims are expressed.

I claim as my invention:

1. In an oculometer comprising a source of radiant energy, light-responsive means, means directing energy from said source to fall upon the eye of an observer for reflection thereby as a diverging beam, lens means focusing energy reflected from said eye as a converging beam on said light-responsive means, and means for deriving from the output of the responsive means signals representative of the direction of regard of the observer, the improvement which comprises:

an apertured member having an aperture of smaller effective diameter than the effective diameter of the lens means;

means mounting said member near the lens means, with said aperture in said beam of reflected energy, for oscillation, in its own plane, transverse to the axis of the lens means;

means for causing said oscillation of said member at a selected frequency, the excursion of said oscillation being no greater than the difference between the effective diameters of said aperture and said lens so that, when the eye moves out of focus with respect to the lens and the light-responsive means, a component of said selected frequency appears in said signal, while no such component is present where the eye is at the in-focus portion;

and synchronous demodulating means connected to derive from said component a further signal representative of the defocusing displacement of the eye.

2. Apparatus according to claim 1 in which said member is located between the observer's eye and said lens means.

3. An oculometer comprising in combination:

an image dissector tube including a photocathode, a photomultiplier, an aperture plate therebetween and a pair of orthogonal deflection coils for effectively scanning the aperture with respect to the photocathode;

lens means for projecting on said photocathode the substantially circular image of a source of radiation reflected as a diverging beam from the cornea of an observer, said image being in focus for a particular position of the cornea with respect to the lens means, and moving from a particular position on said photocathode as the observer changes his direction of regard from a predetermined direction;

means including an alternating voltage source of a first frequency for energizing said coils to cause said aperture to perform a circular scan of substantially the same diameter as said image, so that when the center of said scan coincides with the center of said image the output of said photomultiplier remains constant, and when said centers do not coincide said output includes an alternating voltage of the frequency of said source;

synchronous switch means, energized from said source, for deriving from said output a pair of components representative of the displacement between said centers in two orthogonal directions aligned with the directions of action of said deflection coils;

integrating means connecting said switch means to said coils for causing the center of said scan to follow the center of said image as the direction of regard of the observer changes;

apertured means mounted in said beam of radiation near said lens means, the diameter of the aperture being substantially less than that of the lens, so that said beam is in part blocked thereby and in part passes through the aperture therein;

means causing substantially rectilinear transverse oscillation of said apertured means in its own plane, in a direction aligned with one of said orthogonal directions, at a second frequency, the excursion of said vibration being no greater than the difference between said diameters, so that upon defocusing of said image by reason of axial movement of the cornea from said particular position the radiometric centroid of the image undergoes motion which has the frequency of said oscillation and which reverses in phase with reversal in the sense of said defocusing;

and further synchronous switch means energized with said second frequency, for deriving from said output a component representative in sense and magnitude of said defocusing.

* * * * *